United States Patent Office 2,796,666
Patented June 25, 1957

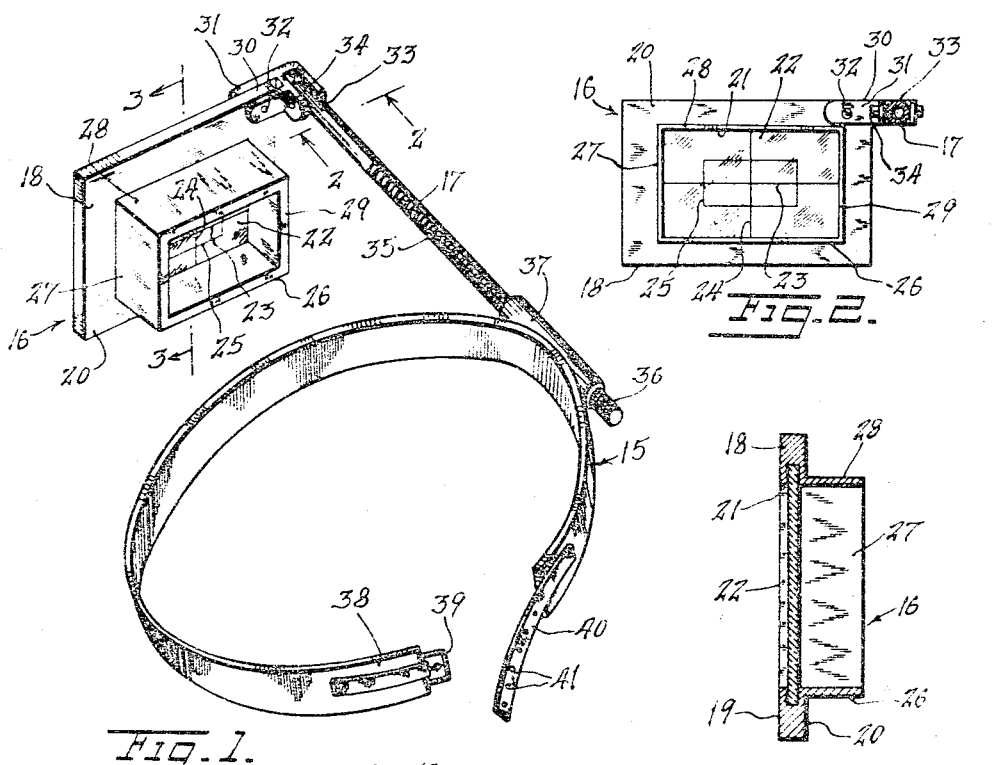
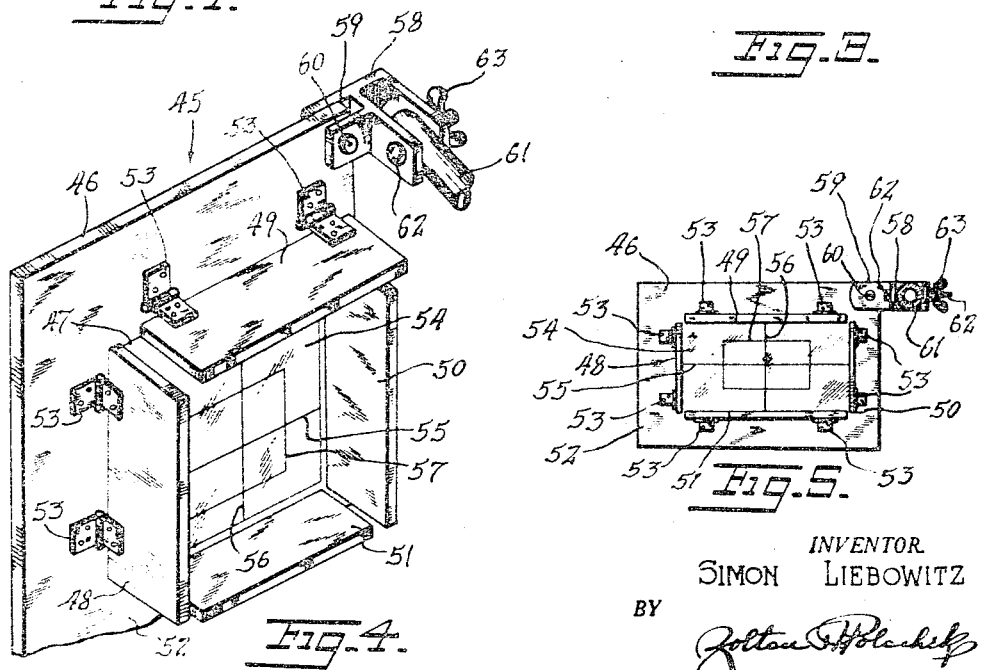

2,796,666
SKETCHING AID HEAD ATTACHMENT
Simon Liebowitz, Bronx, N. Y.

Application October 3, 1955, Serial No. 538,170

3 Claims. (Cl. 33—64)

This invention relates to new and useful improvements in sketching aids for artists, architects, engineers, draftsmen, surveyors and others who sketch.

More particularly, the present invention proposes the construction of an improved head attachment sketching aid device which will hold a viewer at any desired distance from a person's eye and leave both his hands free.

As a further object, the present invention proposes forming the viewer with a viewing opening having a transparent plate member therein with cross hair coordinates and a box coordinate marking around the crossed portion of the cross hair coordinates for dividing the object to be sketched into sections corresponding to similarly divided sections on the sketching surface and to obtain and maintain the proper proportions of the object being sketched.

Still further, the present invention proposes constructing the viewer with light shields completely surrounding the viewing opening and transparent plate member for a clear focus on the object.

Still further, the present invention proposes making the light shields adjustable and so arranged for accurately dividing further the transparent plate member between the marked coordinates.

Another object of the present invention proposes connecting the viewer to the headband by a rod adjustably secured to the viewer frame by a universal joint and adjustably secured to the headband with calibrated markings on the rod for holding the viewer at any desired and predetermined distance from the headband.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a head attachment sketching aid device constructed and arranged in accordance with the present invention.

Fig. 2 is a sectional view taken on line 2—2 of Fig. 1.

Fig. 3 is a sectional view taken on line 3—3 of Fig. 1.

Fig. 4 is a view similar to Fig. 1 but illustrating a modification of the present invention.

Fig. 5 is a rear view of the structure shown in Fig. 4.

The head attachment sketching aid device, in accordance with the first form of the invention illustrated in Figs. 1, 2 and 3, has a headband 15 and a viewer 16 with a spacer rod 17 adjustably connecting the headband and the viewer.

Viewer 16 has a viewer plate frame 18 with a front surface 19 and a rear surface 20 and a viewing opening 21. A transparent viewer plate 22 of glass, plastic or the like is mounted in the viewing opening 21 of the viewer plate frame 18.

Scribed, engraved, or otherwise marked on the transparent plate 22 are coordinating cross hair line marks 23 and 24 extending horizontally and vertically across the viewing opening 21. A coordinating box-shaped hair line mark 25 is also provided in the viewing opening 21 on the transparent plate 22 around the crossed portions of the cross hair line marks 23 and 24.

Light shields 26, 27, 28 and 29 extend from the rear surface 20 of the viewer plate frame 18 around the viewing opening 21. Preferably the light shields are formed integral with the viewer plate frame 18.

At the upper corner 30 of the viewer plate frame 18, a bracket 31 is adjustably secured, as by rivet or bolt 32. The spacer rod 17 has one end 33 adjustably and pivotally secured to the bracket 31, as by pin or bolt 34.

Spacer rod 17 has calibrated markings 35 adjacent its other end 36. The end 36 is adjustably, slidably and frictionally secured in a sleeve 37 on the headband 15.

Headband 15 also has a buckle end 38 with a buckle 39 and another end 40 with holes 41 for securing to the buckle to make the strap or headband 15 adjustable to fit any size head.

To use the device, a person buckles the headband around his head and looks through the viewer at the object to be sketched. The viewer is moved to the proper distance either by calibrated marking on the spacer rod or by judging of the sketcher. The object to be sketched is intersected by the hairline marks and lined up by the box shaped hair line mark.

The modification of the invention illustrated in Figs. 4 and 5 is characterized by the provision of a viewer 45 having a frame plate 46 with a viewing opening 47 which is framed by spaced light shields 48, 49, 50 and 51 adjustably mounted on the back surface 52 of the frame plate 46 by hinges 53.

A transparent viewing plate 54 is mounted in the viewing opening 47 and coordinating hairline cross hair marks 55 and 56 and box coordinate 57 are provided on this plate 54. A bracket 58 is adjustably secured to one upper corner 59 of the frame plate 46, as by bolt 60. A spacer rod 61 is adjustably and pivotally secured to the bracket 58 as by bolt 62 and wing nut 63. The hinges 53 permit the light shields 48, 49, 50 and 51 to be moved so as to further divide and subdivide the viewing opening between the coordinate markings on the transparent viewing plate 54.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new and desire to secure by United States Letters Patent is:

1. A head attachment sketching aid device comprising a headband, a viewer plate frame having a viewing opening, light shields secured to the viewer plate frame around the viewing opening, coordinating cross hair line marks extending across the viewing opening, a spacer rod pivotally secured at one end to a universal joint on the viewer plate frame, and means on the headband adjustably to receive and hold the other end of the spacer rod, said means being a sleeve secured to the side of the headband and said rod being slidably and frictionally fitting in said sleeve, said rod being calibrated along its length adjacent the sleeve fitting end.

2. A head attachment sketching aid device comprising a headband, a viewer plate frame having a viewing opening, light shields secured to the viewer plate frame around the viewing opening, coordinating cross hair line marks extending across the viewing opening, a spacer rod pivotally secured at one end to universal joint on the viewer plate frame, and means on the headband adjustably to receive and hold the other end of the spacer rod, said light shields being hingedly connected to the viewer plate frame.

3. A head attachment sketching aid device comprising a headband, a viewer plate frame having a viewing opening, light shields secured to the viewer plate frame around the viewing opening, coordinating cross hair line marks extending across the viewing opening, a spacer rod pivotally secured at one end to the viewer plate frame, means on the headband adjustably to receive and hold the other end of the spacer rod, said light shields being secured to the viewer plate frame at the rear of the viewer plate frame, a coordinating box-shaped hair line mark in the viewing opening around the crossed portion of the cross hair line marks and hinges connecting said light shields to the viewer plate frame for moving the shields to bisect and otherwise divide the viewer frame opening between the cross hair and box-shaped hair line marks.

References Cited in the file of this patent

UNITED STATES PATENTS

| | | |
|---|---|---|
| 666,415 | Fall | Jan. 22, 1901 |
| 940,504 | Brayton | Nov. 16, 1909 |
| 1,024,506 | Graham | Apr. 30, 1912 |
| 2,263,101 | Perry | Nov. 18, 1941 |